March 30, 1926. Re. 16,302

H. B. SHERMAN

STEEL LUMBER

Original Filed Jan. 23, 1922

Witness:
W. K. Olson

Inventor:
HOWARD B. SHERMAN
By Jones, Addington, Ames & Aiken
Attys.

Reissued Mar. 30, 1926. Re. 16,302

UNITED STATES PATENT OFFICE.

HOWARD B. SHERMAN, OF BATTLE CREEK, MICHIGAN.

STEEL LUMBER.

Original No. 1,548,810, dated August 4, 1925, Serial No. 531,088, filed January 23, 1922. Application for reissue filed October 15, 1925. Serial No. 62,678.

*To all whom it may concern:*

Be it known that I, HOWARD B. SHERMAN, a citizen of the United States, residing at Battle Creek, in the county of Calhoun and State of Michigan, have invented certain new and useful Improvements in Steel Lumber, of which the following is a specification.

My invention relates to structural steel members and methods for manufacturing such articles, generally known as steel lumber, for building construction.

More particularly my invention has special reference to steel lumber and the method of manufacturing the same, which lumber may serve in a building construction as a substitute for wooden joists, rafters, studs, lathing, flooring and the like and, at the same time, perform the functions required of such corresponding wooden members in a much more satisfactory manner.

Again, by means of my invention, steel lumber may be conveniently and economically manufactured preferably from a unitary rolled section or a one-piece structure that may then be readily formed into the requisite shape to serve as a substitute for the wooden members that have heretofore entered into a building construction.

My invention, broadly considered, consists of a self-contained unitary steel lumber section which can be fabricated completely at the factory or before installation with all the constituent parts thereof permanently and preferably integrally formed, so that it can be shipped and installed as a unit, the same comprising essentially a combination steel lumber section possessing a relatively heavy or thick studding portion to constitute the weight supporting element of a building structure, such as joist or studding, and one or more relatively thin plate sustaining portions permanently formed upon the studding portion and extending laterally therefrom and of a sufficient width, in conjunction with the adjoining lumber section, to span the space between adjacent studding portions, said sustaining plate portions serving as lathing, either external or internal, on the ceiling or side walls, or flooring and the like of a building structure.

To compare specifically such corresponding wooden members entering into a building construction with the steel lumber of my present invention, I may state that wooden parts, such as joists, rafters, studs, lathing, flooring and the like are made in separate and distinct pieces, each requiring separate manufacturing, handling and assembling in order to incorporate them properly into a building structure. The steel lumber of my present invention may preferably be manufactured from a one-piece or unitary rolled section which, when properly formed, serves as a combination joist, lathing, and flooring structure, or a combination stud, interior lathing and exterior lathing structure or similar combinations some of which I hereinafter refer to specifically. My formed steel lumber sections, after being formed in accordance with requirements, are then assembled into a built-up structure by securing the lumber sections to one another in any suitable and permanent manner, thus procuring a fabricated building construction.

Steel lumber has heretofore been proposed and manufactured but the various sections, such as joints, studs, rafters, flooring, lathing and the like constituting the prior manufactured articles have been made as separate pieces and, in some instances, particularly joists and studs, have been built up from sheet steel parts, such as channel irons and plates. Again, in a building construction employing such prior steel lumber sections as studs, joists, rafters and the like, the metal lathing or siding or flooring had to be separately handled and applied to the studding, comprising the joists and studs, as distinct elements, and this condition has also obtained when exterior lathing was required for a stucco exterior. Such structures in which the flooring or lathing portions are made separate from the joists, studs or rafters and must be assembled on the job are more expensive to manufacture and install than the combination sections of my invention in which the studding portions and the sustaining plates for the flooring or lathing can be fabricated at the factory as self contained unitary combination sections which can be installed on the job by merely fitting and fastening the several lumber sections together, no metal working being necessary on the job and, in consequence, a cheaper type of labor being permissible for installation.

An object of my present invention is to provide a steel lumber section from which a building construction may be fabricated and which comprises a unitary piece or structure that is formed to serve either as a stud and interior and exterior lathing, or as a joist and the associated lathing and flooring, or as a studding and a relatively thin sustaining plate that may serve in connection with the studding of a building construction.

Another object of my invention is to provide a process of manufacturing such steel lumber as indicated above, which consists in first rolling a properly shaped steel section which is subsequently formed to provide the steel lumber sections described above.

A further object of my invention is to provide steel lumber sections that are capable of being expeditiously assembled and permanently secured to one another without requiring any expensive fitting or matching of the sections entering into a fabricated building construction.

Another object of my invention is to provide a building construction which is fabricated from steel lumber sections that are secured to one another and assembled to form a permanent skeleton structure.

Other objects of my invention will be hereinafter described and for a better understanding of the nature and scope of my invention, reference may be had to the following description and the accompanying drawing, in which—

Figure 1:
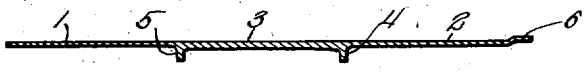
Figure 1 is a cross sectional view showing a rolled steel section embodying a form of my invention.
Figure 2:
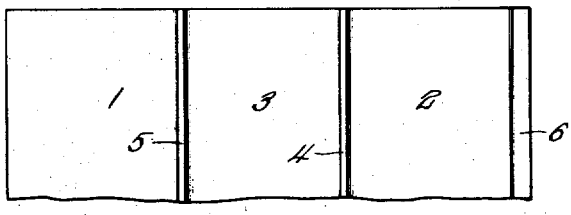
Fig. 2 is a bottom plan view of the rolled steel section of Fig. 1.

Referring to Figs. 1 and 2, the rolled steel section, which is formed in a unitary piece, is preferably manufactured from a steel slab of suitable mass and comprises a relatively thick central portion 3 and two laterally extending and relatively thin sustaining plate portions 1 and 2. One face of the thick portion 3 is provided, longitudinally of and adjacent to its sides, with laterally extending lugs 4 and 5. The outer edge of the side portion 2 is provided with a longitudinally extending offset 6, which is formed in situ to extend above the plane common upper surfaces of the portions 1, 2 and 3. A single section of the form illustrated may be rolled into staple lengths—namely, 12 feet, 14 feet, 16 feet and the like, corresponding to the standard lengths in which wooden lumber that enters into building construction is furnished. It is to be observed that this section is also so designed that it may be rolled in any suitable rolling mill of the usual type.

In conformity with standard dimensions and spacings of members employed in building construction when wooden sections are utilized, the single rolled section of Figs. 1 and 2, in addition to being rolled into staple lengths as mentioned above, may be so proportioned that the central portion 3 is from 4″ to 6″ wide and about ⅛″ thick, and the portions 1 and 2 may be 16″ wide and approximately $\frac{1}{32}$″ thick. In building construction, it is customary to space the sections comprising the studding, namely the joists and studs, on 16″ centers and, for this reason, I have suggested 16″ as a suitable and convenient transverse dimension of the sustaining plate portions 1 and 2. The depth of studs or joists usually entering into a standard building construction may vary from 4″ to 6″ and, to this end, I have suggested these transverse dimensions for the portion 3 of my steel lumber section. Of course, I am not to be limited to any arbitrary dimensions or proportions of the several portions of the unitary sections from which I form my steel lumber.

Figure 3:
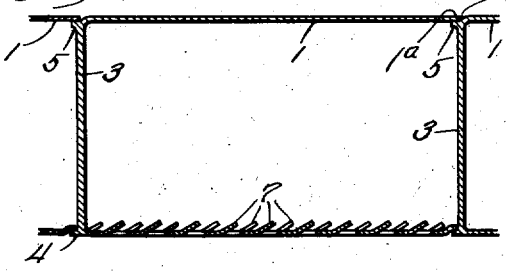
Fig. 3 is a view in elevation, and somewhat diagrammatic, showing a building construction comprising steel lumber formed from the rolled steel section of Figs. 1 and 2.
Figure 4:
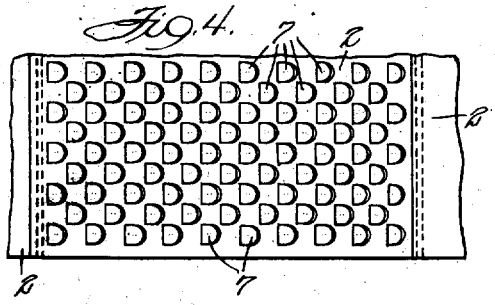
Fig. 4 is a plan view showing the lathing portion of a steel lumber section embodying a form of my invention.

Referring to Fig. 3 I have shown how the rolled section of Figs. 1 and 2 may be subsequently formed. It will be noted that the portions 1 and 2 are bent at right angles to the portion 3, thus forming an open rectangular structure with the projecting flanges 4 and 5 exposed which constitute supporting ledges, as will be hereinafter pointed out. In assembling this form section in a building construction, the portion 3, which constitutes an I-beam, serves as either the joist or the stud, as desired. In the event that the portion 3 performs the function of a joist, the upper bent-over sustaining plate portion 1 may then serve as a flooring and the lower bent-over sustaining plate portion 2 as lathing, particularly if it is perforated as shown at 7 in Fig. 4. Of course, it is to be understood that both the sustaining plate portions 1 and 2 may be ribbed, perforated or otherwise distorted into any of the forms adapting them for lathing, flooring and the like. In the event that the portion 3 serves as a stud, the bent-over sustaining plate portion 2 may then serve as an interior lathing and the sustaining plate portion 1 as an exterior lathing to which stucco may be applied.

Figure 5:
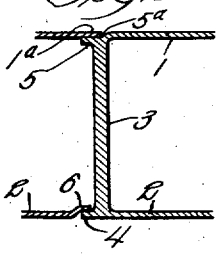
Fig. 5 is an enlarged view showing in detail the assembling of the steel lumber sections of Fig. 3.

In assembling my steel lumber in a fabricated building construction, it will be observed by reference to Fig. 5, that the flange 5 of Fig. 1 serves as a supporting ledge upon which an edge $1^a$ of the portion 1 of similar and adjacent steel lumber sections may rest. Where the flange 5 extends from the portion 3, a recess $5^a$ is formed when the laterally extending portion 1 is bent over. The recess $5^a$ permits the edge $1^a$ of an abutting lumber section to be received therein and supported on the ledge 5 without destroying the levelness of the upper surface of the assembled construction. The flange 4 constitutes a supporting ledge which receives the offset 6 of a similar and adjacent formed steel lumber section. Through the agency of the offset 6 formed on the separate steel lumber sections the lower surfaces of the contiguous portions 2 may lie in a common plane in a built-up construction. In order to secure permanently adjacent steel lumber sections to one another in a building construction, the portion 1 may be spot-welded to the flange 5, and, similarly, the offset 6 may be spot-welded to the flange 4. In this fashion, a building construction may be readily fabricated and the steel lumber sections embodying my invention may be permanently secured in position with very little expense in matching or fitting.

Figure 6:
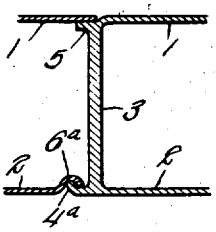
Fig. 6 is a view showing a modified form of steel lumber sections built in accordance with my invention and the method of assembling the same in a fabricated building construction.

Referring to Fig. 6, I have shown a modified form for securing the portion 2 of a steel lumber section to the portion 3 of an adjacent steel lumber section. In this event, a flange $4^a$ is bent upon the section and is adapted to engage with a hook portion $6^a$ which is formed on the portion 2 in lieu of the offset 6 of Fig. 1. In this circumstance, spot-welding of the portion 2 to the portion 3 of an adjacent lumber section may be dispensed with and the steel lumber sections will permanently retain their relative positions in the fabricated building construction.

Figure 7:
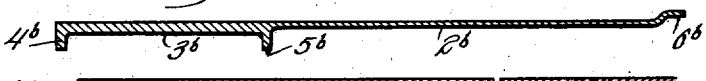
Fig. 7 is a cross sectional view of a modified form of a rolled lumber section embodying my invention.

Attention is now directed to Fig. 7 which shows a unitary rolled section comprising a relatively thick studding portion $3^b$ having two spaced laterally extending flanges $4^b$ and $5^b$ and a relatively thin sustaining plate portion $2^b$ which is integrally formed with the studding portion $3^b$. The outer edge of the portion $2^b$ is offset at $6^b$ for the purpose of providing a contiguous surface comprising the several thin portions $2^b$ in a built-up building construction. After the unitary section of Fig. 7 has been rolled, the relatively thin portion $2^b$ is bent at right angles to the studding portion $3^b$ oppositely thereof, and immediately adjacent to, the laterally extending flange $5^b$, thus exposing the flanges $4^b$ and $5^b$.

Figure 8:
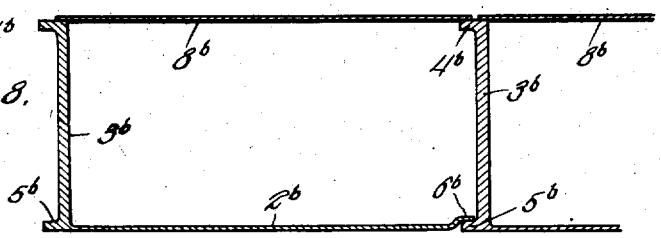
Fig. 8 is a view of a building construction comprising the steel lumber sections of the type illustrated in Fig. 7.

In the building construction of Fig. 8, side-by-side lumber sections are assembled as shown. It will be observed that the offset portion $6^b$ of one steel lumber section engages the flange $5^b$ of an immediately adjacent lumber section. Steel plates $8^b$ are spaced from the portions $2^b$ and are coextensive therewith to bridge the spaces between the upper flanges $4^b$ formed on the adjacent steel lumber sections. It is, of course, obvious that either the plates $8^b$ or the relatively thin sustaining plate portions $2^b$ may constitute the lathing for the building construction. The several lumber sections, as well as the steel plates $8^b$ may be secured to one another in a built-up construction in order to form a permanent skeleton steel work for a building.

As pointed out above, the term "studding portion," as used herein, comprises in its meaning such members as joists, studs, and the like that are adapted to serve as the weight supporting elements or members of a building structure. Likewise, the terms "sustaining plate portion" and "lathing portion" are used synonymously and comprise in their meaning lathing, either external or internal, on the ceiling or side walls, or flooring and the like, which elements of a building structure are relatively thin in comparison with the studs or joists and are of sufficient width to span the spaces between adjacent members constituting the studding portions of a building structure. As hereinbefore described, the spacings and dimensions of the "studding portions" and of the "lathing portions" or "sustaining plate portions" may be in conformity with the present standard spacings and dimensions employed in building structures but, of course, I am not limited to any arbitrary selection of size or dimension or spacing for my present steel lumber.

From the foregoing description of my invention, it will be apparent that I have provided a very economical steel lumber section which may be readily formed in the preferred form from a single rolled section and which permits of convenient assembly in a building construction. The process which I have invented to procure my steel lumber section, in its preferred form, is expeditious to perform and dispenses with the necessity of employing steel lumber sections that are severally built-up from various steel parts and employed as separate units such as joists, studs, etc. to which separate lathing or flooring sheets must be attached during installation on the job.

While I have herein shown and described an embodiment of my invention, it is to be understood that I do not desire to be limited to the specific structures shown and described and to the specific process of manufacture, since many modifications may be made in my invention without departing from the spirit and scope of the appended claims.

What I claim as new and desire to secure by Letters Patent of the U. S. is:—

1. A one piece steel lumber section rolled into a unitary member comprising a relatively thick studding portion that serves as a building supporting element, and a relatively thin sustaining plate portion formed integrally therewith that extends laterally from one side of said studding portion and possesses a width suitable to span the space between studding portions of adjacent lumber sections.

2. A one piece steel lumber section rolled into a unitary member comprising a central relatively thick studding portion, and a relatively thin sustaining plate portion extending laterally from said studding portion and having an offset formed on its outer edge to engage with an adjacent lumber section.

3. A steel lumber section formed from a rolled unitary member comprising a relatively thick studding portion having exposed integral longitudinal flanges along its two edges, and a relatively thin sustaining plate portion bent over and extending laterally from said studding portion adjacent to one of said flanges and of a width suitable to extend to an adjacent lumber section.

4. A steel lumber section formed from a rolled unitary member comprising a relatively thick studding portion having exposed integral longitudinal flanges along its two edges, and a relatively thin sustaining plate portion extending laterally from said studding portion adjacent to one of said flanges, said studding portion being longitudinally recessed adjacent the other of said flanges.

5. A one-piece steel lumber section rolled into a unitary member comprising a central relatively thick studding portion that serves as a building supporting element, a flange projecting therefrom, a relatively thin sustaining plate portion constituting a lathing portion extending laterally from said studding portion adjacent to one of its edges, and a second relatively thin sustaining plate portion extending laterally from said studding portion adjacent to the other of its edges, said portions being integrally formed.

6. A steel lumber section comprising a central studding portion, flanges projecting therefrom along its longitudinal periphery, a sustaining plate portion constituting a lathing portion extending laterally from said studding portion adjacent to one of its edges, and a second sustaining plate portion extending laterally from said studding portion adjacent to the other of its edges, said portions being integrally formed and said studding portion being longitudinally recessed immediately adjacent to one of said flanges and on its side opposite to one of said sustaining plate portions that extend laterally from said studding portion.

7. A steel lumber section comprising a central studding portion, attaching means on said studding portion for supporting an adjacent lumber section, a sustaining plate portion constituting a lathing portion extending laterally from said studding portion adjacent to one of its edges, a second sustaining plate portion extending laterally from said studding portion adjacent to the other of its edges, said portions being integrally formed, and an exposed longitudinal recess being formed on said studding portion immediately adjacent to at least one of said laterally extending portions.

8. A steel lumber section comprising a central relatively thick studding portion, flanges projecting therefrom along its longitudinal periphery, a relatively thin plate sustaining portion constituting a lathing portion extending laterally from said studding portion adjacent to one of said flanges, and a second relatively thin sustaining plate portion parallel to said lathing portion and extending laterally from said studding portion adjacent to the other of said flanges, said portions being integrally formed.

9. A steel lumber section comprising a central studding portion, flanges projecting therefrom along its longitudinal periphery, a sustaining plate portion constituting a lathing portion extending laterally from said studding portion adjacent to one of said flanges, a second sustaining plate portion parallel to said lathing portion extending laterally from said studding portion adjacent to the other of said flanges, said portions being integrally formed and said lathing portion having an offset formed along its outer edge.

10. A steel lumber section comprising a central studding portion, flanges projecting therefrom along its longitudinal periphery, a lathing portion extending laterally from said studding portion adjacent to one of said flanges, a second sustaining plate portion parallel to said lathing portion extending laterally from said studding portion adjacent to the other of said flanges, said portions being integrally formed and said lathing portion having an offset formed along its outer edge, and an exposed longitudinal recess being formed on said studding portion intermediate said second laterally extending portion and the corresponding flange.

11. A building construction comprising a plurality of side-by-side steel lumber sections, each of which constitutes a unitary member having a relatively thick weight supporting studding portion, a relatively thin lathing portion and a second sustaining plate portion co-extensive with said lathing portion, attaching means on the studding portion of each lumber section for securing adjacent lumber sections to one another, the several steel lumber sections when in assembled position having their lathing portions contiguous and coinciding in a common substantially plane surface, and said lathing portions and said opposed co-extensive sustaining plate portions of the several lumber sections engaging said attaching means on the studding portions of the steel lumber sections adjacent thereto.

12. A building construction comprising side-by-side steel lumber sections each of which constitutes a unitary member having a relatively thick weight supporting studding portion a relatively thin lathing portion integral with said studding portion and a second integral sustaining plate portion that is co-extensive with but spaced from said lathing portion, the several unitary steel lumber sections when in their assembled positions in the building construction having their lathing portions contiguous with one another and coinciding in a common, substantially plane surface, and their sustaining plate portions likewise contiguous and coinciding in a common, substantially plane surface, and means for securing severally the steel lumber sections to the steel lumber sections adjacent thereto.

13. A building construction comprising side-by-side steel lumber sections each of which constitutes a unitary member having a relatively thick weight supporting studding portion, a relatively thin sustaining plate portion integral with said studding portion and a second relatively thin sustaining plate portion being co-extensive with but spaced from said first integrally formed sustaining plate portion, the several steel lumber sections when in their assembled positions having their corresponding sustaining plate portions contiguous with one another coinciding in a common coplanar surface, and means fer securing at least one of said sustaining plate portions of one of said steel lumber sections to the studding portion of one of the adjacent steel lumber sections.

14. A building construction comprising side-by-side steel lumber sections each comprising a unitary member, having a relatively thick weight supporting studding portion and two relatively thin plate sustaining portions spaced from each other and projecting laterally from said studding portion, all of said portions being integrally formed from a unitary member, spaced projecting ledges formed on the exposed face of said studding portion, an offset formed on the outer edge of one of said plate sustaining portions, said steel lumber sections being positioned side-by-side so that one of said ledges formed on each studding portion engages the outer edge of one of said plate sustaining portions of an abutting steel lumber section and the other of said ledges engages the offset formed on one of the plate sustaining portions of an abutting steel lumber section.

15. A steel lumber section constituting a unitary member and comprising a relatively thick studding portion having spaced longitudinal flanges extending laterally therefrom, and a relatively thin sustaining plate portion extending from said studding portion at right angles thereto and oppositely of one of said flanges.

16. A steel lumber section constituting a unitary member and comprising a relatively thick studding portion having spaced longitudinal flanges extending laterally therefrom, and a relatively thin sustaining plate portion extending from the said studding portion at right angles thereto and oppositely of one of said flanges, the outer edge of said relatively thin portion terminating in an offset.

17. A steel lumber section formed from a unitary member and comprising a relatively thick studding portion having longitudinally extending and exposed flanges projecting laterally from its edges, and a relatively thin sustaining plate portion also extending laterally from said studding portion but oppositely of and adjacent to one of said flanges.

18. A building construction comprising side-by-side steel lumber sections each being rolled from a unitary member and comprising a relatively thick weight supporting studding portion having at least one exposed laterally extending flange on one of its edges and at least one relatively thin plate sustaining portion integral with said studding portion and extending laterally therefrom and on a side opposite to said flange, said plate sustaining portion being of a width to span the space between the studding portions of adjacent lumber sections, the said steel lumber sections when in assembled positions having their relatively thin plate sustaining portions contiguous with one another and each being supported at their outer edges upon said flanges of the studding portions of the adjacent steel lumber sections.

19. A building construction comprising a plurality of side-by-side steel lumber sections, each being rolled from a unitary member and comprising a relatively thick weight supporting studding portion and a relatively thin sustaining plate portion extending laterally thereform and adapted to span the space between the studding portions of adjacent lumber sections, each lumber section having attaching means whereby the sustaining plate portion of one lumber section may be supported at its outer end by the studding portion of an adjacent lumber section and whereby the several steel lumber sections when in assembled positions have their sustaining plate portions contiguous and coincident to form a substantially co-planar surface and being supported at their outer ends upon the studding portions of the next adjacent steel lumber sections through the agency of said attaching means.

20. A steel lumber section rolled from a unitary member comprising a relatively thick weight supporting studding portion that serves as a building supporting element, and a relatively thin sustaining plate portion formed integrally therewith that extends laterally from one side of said studding portion and possesses a width suitable to span the space between studding portions of adjacent lumber sections, the steel lumber section being provided with means for attaching thereto the outer edge of a sustaining plate portion of an adjacent lumber section.

21. A steel lumber section formed from a unitary member comprising a relatively thick studding portion that serves as a building supporting element, and a relatively thin sustaining plate portion that extends laterally from one side of said studding portion and possesses a width suitable to span the space between studding portions of adjacent lumber sections, said studding portion being provided adjacent to one of its edges with a longitudinal recess for receiving therein the outer edge of a sustaining plate portion of an adjacent lumber section.

22. A steel lumber section formed from a unitary member comprising a relatively thick studding portion that serves as a building supporting element, and a relatively thin sustaining plate portion that extends laterally from one side of said studding portion and possesses a width suitable to span the space between studding portions of adjacent lumber sections, said studding portion being provided adjacent to one of its edges with a longitudinally extending flange and a recess for attaching thereto a sustaining plate portion of an adjoining lumber section.

23. A steel lumber section comprising a relatively thick weight supporting studding portion, a relatively thin sustaining plate portion constituting a relatively thin lathing which extends laterally from said studding portion adjacent to one of its longitudinal edges, a second relatively thin sustaining plate portion extending laterally from said studding portion adjacent to the other of its longitudinal edges, said portions being integrally formed from a rolled unitary member, and attaching means for supporting thereupon adjacent lumber sections.

24. A steel lumber section rolled into a unitary member comprising a relatively thick studding portion that serves as a building supporting element, a relatively thin sustaining plate portion formed integrally therewith that extends laterally from one side of said studding portion and possesses a width suitable to span the space between adjacent lumber sections, and means on said studding portion for supporting the outer edge of a sustaining plate portion of an adjacent lumber section.

25. A steel lumber section rolled into a unitary member comprising a relatively thick studding portion that serves as a building supporting element, a relatively thin plate sustaining portion formed integrally with said studding portion and possessing a width suitable to span the space between adjacent lumber sections, and means for supporting the outer edge of a sustaining plate portion of an adjacent lumber section whereby the sustaining plate portions of said both lumber sections may form a contiguous substantially co-planar surface.

26. A steel lumber section rolled into a unitary member comprising a relatively thick weight supporting studding portion that serves as a building supporting element, a relatively thin sustaining plate portion formed integrally therewith and possessing a width suitable to span the space between studding portions of adjacent lumber sections, and a flange projecting from said studding portion.

27. A self contained permanently organized steel lumber section adapted to be fabricated completely before installation and constituting a unitary structure serving as a combination building element, which comprises a relatively thick weight supporting studding portion, and a relatively thin sustaining plate portion extending laterally from said studding portion and of sufficient width, in conjunction with the adjoining lumber section, to span the space between adjacent studding portions.

28. A self contained permanently organized steel lumber section adapted to be fabricated completely before installation and constituting a unitary structure serving as a combination building element, which comprises a relatively thick weight supporting studding portion, and a relatively thin sustaining plate portion extending laterally from said studding portion and possessing a width suitable to span the space between studding portions of adjacent lumber sections.

29. A self contained permanently organized steel lumber section adapted to be fabricated completely before installation and constituting a unitary structure serving as a combination building element, which comprises a relatively thick weight supporting studding portion, and a pair of relatively thin sustaining plate portions extending laterally from said studding portion and each being of sufficient width, in conjunction with the adjoining structure, for spanning between adjacent studding portions.

30. A self contained permanently organized steel lumber section adapted to be fabricated completely before installation and constituting a U-shaped unitary structure serving as a combination building element, which comprises a relatively thick weight supporting studding portion, and relatively thin sustaining plate portions extending laterally from said studding portion in the same direction and each possessing a width, in conjunction with the adjoining lumber section, to span the spaces between the studding portions of adjacent lumber sections.

31. A self contained permanently organized steel lumber section adapted to be fabricated completely before installation and constituting a unitary structure serving as a combination building element, which comprises a relatively thick weight supporting studding portion, and a relatively thin sustaining plate portion that extends laterally from one side of said studding portion and possesses sufficient width, in conjunction with the adjoining lumber section, to span the space between adjacent studding portions, the lumber section being provided with suitable means for supporting the outer edge of a sustaining plate portion of an adjacent lumber section.

32. A building construction comprising side-by-side steel lumber sections, each lumber section adapted to be fabricated completely and permanently organized before installation and constituting a self contained unitary combination building element which comprises a relatively thick weight supporting studding portion, and at least one relatively thin plate sustaining portion extending laterally therefrom, said sustaining plate portion being of a sufficient width, in conjunction with the adjoining lumber section to span the space between the studding portions of adjacent lumber sections, the said combination lumber sections when in assembled positions having their plate sustaining portions contiguous and suitably supported at their outer ends by the adjoining lumber sections.

In testimony whereof, I have subscribed my name this 12th day of October, 1925.

HOWARD B. SHERMAN.